G. D. SCHEIFFLER.
FEED REGULATOR.
APPLICATION FILED FEB. 23, 1909.

940,943.

Patented Nov. 23, 1909.

Witnesses
H. O. Van Antwerp
Georgiana Chace

Inventor
George D. Scheiffler
By Luther V. Moulton
Attorney

UNITED STATES PATENT OFFICE.

GEORGE D. SCHEIFFLER, OF JACKSON, MICHIGAN.

FEED-REGULATOR.

940,943.　　　　Specification of Letters Patent.　　Patented Nov. 23, 1909.

Application filed February 23, 1909. Serial No. 479,423.

*To all whom it may concern:*

Be it known that I, GEORGE D. SCHEIFFLER, a citizen of the United States of America, residing at Jackson, in the county of Jackson and State of Michigan, have invented certain new and useful Improvements in Feed-Regulators; and I do hereby declare the following to be a full, clear, and exact description of the invention, such as will enable others skilled in the art to which it appertains to make and use the same.

Figures 1, 2:
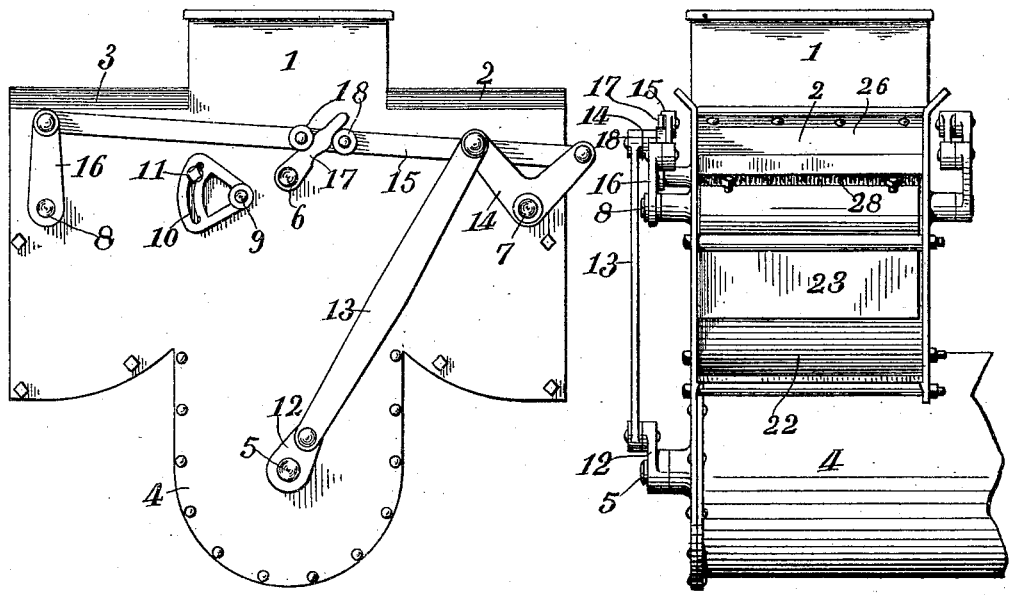
Figures 3, 4:
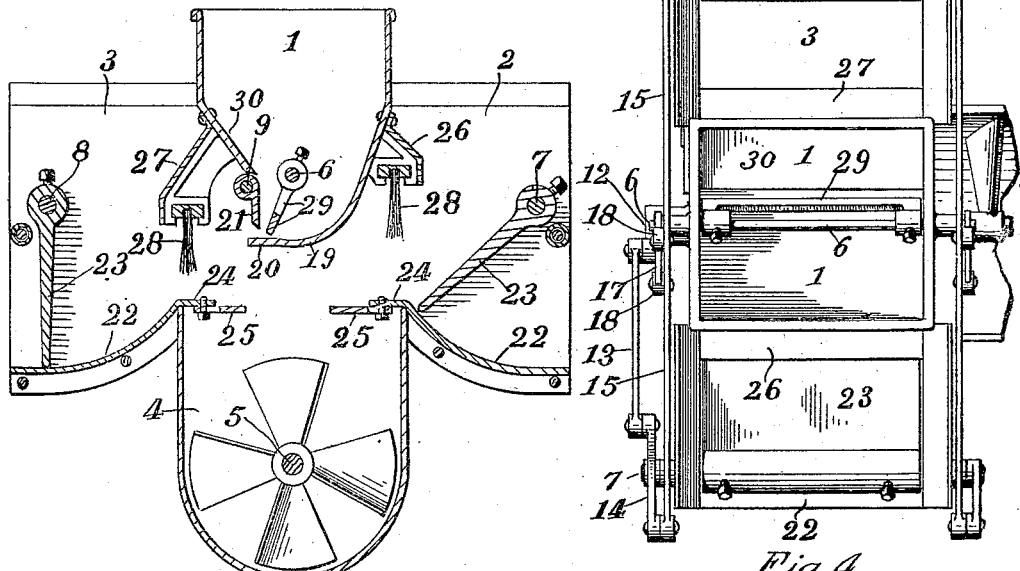

My invention relates to improvements in feed regulators and more particularly to feed regulators for concrete mixers, and its object is to provide a simple and satisfactory machine that will feed broken stone, gravel, sand, or other like material without clogging or breaking, and to provide the device with various new and useful features hereinafter more fully described and particularly pointed out in the claims, reference being had to the accompanying drawings in which:

Figure 1 is an end elevation of a device embodying my invention; Fig. 2 a side elevation of the same; Fig. 3 a transverse vertical section; and, Fig. 4 a plan view of the same.

Like numbers refer to like parts in all of the figures.

1 is a central hopper for cement, 2 and 3 side hoppers to receive sand, broken stone or gravel, as occasion requires.

4 is a mixer of any convenient construction located between the hoppers 2 and 3 and directly below the hopper 1 into which mixer the various ingredients are discharged from the hoppers by mechanism hereinafter described.

5 is the mixer shaft which constitutes also the driving shaft for the feeding mechanism.

6, 7, and 8 are rock shafts in the respective hoppers 1, 2, and 3 and spaced apart from the respective bottoms thereof.

9 is a shaft in the upper part of a lateral opening to the hopper 1, said shaft being rotatively adjusted by a segment 10 and a binding screw 11.

12 is a crank on the shaft 5 which shaft is driven by any convenient means, not shown.

13 is a connecting rod from the crank 12 to one arm of a bell crank lever 14 fixed on the shaft 7 to oscillate the same, the other arm of said bell crank lever is connected by a rod 15 to the arm 16 fixed on the rock shaft 8 to oscillate the same.

17 is an arm fixed on the shaft 6 to oscillate the same which arm is operated by rollers 18 on the rod 15 engaging opposite sides of the arm 17. On the shaft 9 is mounted a gate 21 adjusted to regulate the flow of cement from the hopper. The bottom 19 of the hopper 1 is concentric with the axis of the shaft 6 and traversed by a laterally oscillating bar 29, which sweeps the cement toward the gate 21 and outward over a horizontal extension 20 of the hopper bottom, whereby at each oscillation of the bar 29 a quantity of cement greater or less in amount, according to the adjustment of the gate 21, is pushed beneath the gate and discharged over the edge of the extension 20. The bottom of each hopper 2 and 3 is also concentric with the axis of the respective shafts 7 and 8, and the inner edge of each hopper bottom 22 is extended inward horizontally at 24 over the mixer 4, and has an adjustable extension 25 attached thereto, whereby the quantity discharged from each hopper may be regulated. Upon each shaft 7 and 8 is mounted a swinging or pendulum wall 23 which wall constitutes the sole outer walls of the respective hoppers 2 and 3. The lower edge of each wall traverses the concave bottom 22 at each oscillation, and thus sweeps the contents of the hopper inward, upward, and over the extensions 24 and 25 discharging the same into the mixer.

To retard the flow of material from the hoppers 2 and 3 and at the same time permit broken stone and other solid substances of a greater or less bulk to pass freely, brushes 28 are supported beneath outwardly inclined walls 26 and 27, attached to the opposite sides of the hopper 1 and extending above the inner edges of the bottoms 22 to the respective hoppers. The hopper 1 is also provided with an inwardly inclined wall 30 terminating above the shaft 9. The sweep 29 consists of a bar traversing close to the concave 19 and spaced apart from the shaft 6 whereby a portion of the cement, retarded by the gate 21, will escape over the bar, and between it and the shaft 6. The material in the hoppers 2 and 3 will be retarded by the extensions 24 and 25 and the brushes 28 and more or less of the material will fall back into the hoppers on the return strokes of the respective pendulum walls 23. The quantity of material can thus be regulated at pleasure by adjusting the gate 21 and extensions 25. It is also obvious that the amount of feed will depend on the amount of oscillation given to the walls 23 and bar 29.

What I claim is:—

1. A feed regulator comprising a hopper having two end walls and one side wall, a stationary concave bottom spaced apart from the side wall at one side, a shaft in the axis of the concave bottom and spaced apart from the side wall, and a swinging wall forming the opposite wall of the hopper, said swinging wall being supported by the shaft and having its lower edge traversing close to the concave bottom.

2. A feed regulator comprising a hopper having two end walls and one side wall, a concave bottom spaced apart from the side wall at one side to form a discharge opening, a shaft in the axis of the bottom and journaled in the end walls, a swinging wall supported by the shaft and forming the opposite wall of the hopper and means for oscillating the shaft and the swinging wall.

3. A feed regulator, comprising a hopper having a concave bottom and a horizontal extension to the same, a side opening above said extension, a swinging gate in said opening, means for adjusting the gate, a rock shaft in the axis of the bottom, and a bar attached to the shaft and oscillating close to the bottom of the hopper.

4. A feed regulator, comprising a hopper having a concave bottom and a horizontal extension at one side of the same, a rock shaft in the axis of the said bottom, a swinging wall to the hopper supported by the rock shaft at the upper edge and traversing the bottom at the lower edge, and a brush above the said extension and spaced apart therefrom.

5. A feed regulator, comprising a hopper having a concave bottom and a side opening, a horizontal extension beneath said opening, an adjustable member attached to said extension, a brush in the upper part of said opening and above the horizontal extension, a rock shaft in the axis of the bottom, and a swinging wall attached to the rock shaft at its upper edge and traversing the bottom at its lower edge.

6. A feed regulator, comprising a middle hopper having a side opening, side hoppers having side openings, a concave bottom to each hopper, a rock shaft in the axis of each concave bottom, an arm attached to each rock shaft, a rod connected to all of said arms to simultaneously operate the same, means for reciprocating said arms, and a swinging member attached to each rock shaft and traversing the respective concaves.

7. A feed regulator, comprising a central hopper having a concave bottom and a lateral opening, an adjustable gate in said opening, side hoppers having concave bottoms and side openings adjacent the middle hopper, a rock shaft journaled in the axis of the bottom of each respective hopper, a swinging member mounted on each rock shaft and traversing the concave bottom of the respective hopper, an arm on each rock shaft, a rod connected to all of the arms to simultaneously oscillate the same, a driving shaft, and a crank on the driving shaft and connected to one of the arms.

In testimony whereof I affix my signature in presence of two witnesses.

GEORGE D. SCHEIFFLER.

Witnesses:
VERNE W. BADGLEY,
M. M. ALLINGTON.